(12) United States Patent
Cathala et al.

(10) Patent No.: US 7,237,820 B2
(45) Date of Patent: Jul. 3, 2007

(54) MODULE FOR EQUIPPING A MOTOR VEHICLE REAR OPENING PANEL

(75) Inventors: Franck Cathala, Maurepas (FR); Jean-Pierre Eustache, Antony (FR); Laurent Simon, Montigny-le-Bretonneux (FR); Marcel Trebouet, Courbevoie (FR)

(73) Assignee: Valeo Systemes d'Essuyage (FR)

( * ) Notice: Subject to any disclaimer, the term of this patent is extended or adjusted under 35 U.S.C. 154(b) by 573 days.

(21) Appl. No.: 10/275,631

(22) PCT Filed: May 11, 2001

(86) PCT No.: PCT/FR01/01447

§ 371 (c)(1),
(2), (4) Date: Nov. 7, 2002

(87) PCT Pub. No.: WO01/85502

PCT Pub. Date: Nov. 15, 2001

(65) Prior Publication Data

US 2003/0146645 A1 Aug. 7, 2003

(30) Foreign Application Priority Data

May 11, 2000 (FR) .................................. 00 06016

(51) Int. Cl.
*B60J 1/20* (2006.01)
(52) U.S. Cl. .................................. 296/96.17; 15/250.3
(58) Field of Classification Search ............. 296/96.17, 296/56; 15/250.001, 250.12, 250.3, 250.31
See application file for complete search history.

(56) References Cited

U.S. PATENT DOCUMENTS 6,123,384 A * 9/2000 Eustache et al. .......... 296/146.2
6,174,016 B1 * 1/2001 Ponziani ....................... 296/56

FOREIGN PATENT DOCUMENTS

| DE | 2 330 096 | 1/1974 |
| DE | 26 58 745 | 4/1978 |
| DE | 34 06 588 | 9/1985 |
| EP | 0 306 361 | 2/1989 |
| WO | WO 98/58825 | 12/1998 |

* cited by examiner

*Primary Examiner*—Joseph D. Pape
(74) *Attorney, Agent, or Firm*—Young Basile (57) ABSTRACT

A module for equipping a motor vehicle rear opening panel includes a support plate on which are directly mounted accessories, in particular, a drive motor for a wiper device. The support plate forms a plate for closing the drive motor of the wiper device.

27 Claims, 6 Drawing Sheets

MODULE FOR EQUIPPING A MOTOR VEHICLE REAR OPENING PANEL

BACKGROUND

The invention concerns a module for equipping a motor vehicle rear opening panel with a support plate for accessories.

Numerous accessories can be mounted onto the rear opening panel of a motor vehicle, in particular, when it is made up of a rear hatchback of large dimensions.

In this way, the hatchback can support, in addition to is its closing and locking mechanisms, an electric wiper motor, means of positioning a wiper arm in a parked position, a license plate and its lighting systems, but also eventually a third required brake light, or even all or part of the rear turn signal blocks.

All the accessories, which are products independent of the body piece that makes up the hatchback, must be mounted onto the hatchback during vehicle assembly. And yet, the multiplication of accessories leads to an increase of mounting time and multiples the risks of mounting errors, in particular, positioning.

In addition, it is necessary of foresee, for each electric accessory, first, an electric power source, second, means for controlling these accessories, and, finally, monitoring means that allow informing the driver about the functioning state of the accessories, for example, via warning lamps on the dashboard, or by a central electrical management unit of the vehicle.

These multiple connections, which it is necessary to implement on the assembly line of the vehicle, are still possible sources of breakdowns and it is thus necessary to verify them after mounting.

As one can see, the multiplication of electric accessories borne by the rear opening panel of a vehicle can lead to a substantial increase in the total assembly time of the hatchback.

SUMMARY

With the goal of diminishing the assembly time as well as the number of elements to be assembled, the invention proposes a module for equipping a motor vehicle rear opening panel of the type comprising a support plate whereon accessories are directly mounted, in particular, a drive motor for a wiper device, characterized by the support plate forming a plate for closing the drive motor of the wiper device.

According to other characteristics of the invention:

the closing plate of the drive motor is made up of an electrical insulating material and is mounted around at least one lead or cable in an electrical conductive material for electric power supply, of at least one accessory borne or not by the support plate, or for the exchange of signals with this accessory;

the module comprises at least one electrical power supply connection, the body of which is mounted with the closing plate and which is electrically linked to a first end of at least one electric power supply lead;

the module comprises a unique power supply connection of all the electrical power supply leads of the module;

the module comprises at least one electric power supply connection of at least one accessory, the body of which is molded with the closing plate and which is electrically linked to a second end of at least one electric power supply lead of at least one accessory;

the module comprises at least one mounting and/or fixation element of at least one accessory which is molded with the closing plate;

one accessory is a light source;

the light source comprises a lighting block of the interior of the cabin and/or the trunk of the vehicle;

the light source comprises a rear signal light, in particular, a brake light, a turn signal, reverse light, or an anti-fog light or a part of such a light;

the rear signal light pushes against the interior face of a rear window borne by a rear opening panel of the motor vehicle, in particular, with a joint interposition, or pushes against the curve of the opening of an external cabin panel of the opening;

the closing plate comprises means for regulating the position of the rear signal light in relation to the interior face of the rear window or the opening of an external cabin panel of an opening;

the light source comprises a light block of the vehicle exterior, such as a light block of the license plate;

an accessory comprises positioning means, in a parked position, of a wiper arm of a wiper device;

at least one of the accessories, such as an outlet shaft of the drive motor of a wiper device and/or positioning means of a wiper arm, is accessible from the exterior of the vehicle across from one opening pierced in the external cabin panel of the rear opening panel of the vehicle or an opening pierced in a rear window, an accessory comprises an electronic vision system, in particular, a camera which is oriented towards the exterior of the vehicle and which furnishes a representative view of the exterior environment opposite from the electronic vision system;

the representative information of the exterior environment is treated by a treating system, then is transmitted to a display device inside the vehicle which furnishes a representative image of the exterior environment opposite from the electronic vision system;

the representative information of the exterior environment is furnished to a treating system which determines at least one parameter relative to an object from the exterior environment, such as the relative speed or distance between the object in the exterior environment and the vehicle;

the exterior environment object is another vehicle;

the electronic vision system is situated on the interior of the cabin or trunk of the vehicle opposite from a rear window borne by the opening;

the electronic vision system is situated on the interior of the rear opening panel structure, and an opening is pierced in an external cabin panel of the rear opening panel to permit the electronic vision system;

the electronic vision system is fixed onto a detectable plate which is linked to the closing plate via linking means which allow the absorption of dimensional dispersion during the mounting of the module onto the opening;

during the assembly of the equipping module, all or part of an accessory is received in a receptacle in which it is temporarily held by holding means in order to protect it, and during the mounting of the equipping module onto the opening, the accessory can be removed from the receptacle;

the accessory part which is received in the receptacle is protected by a protection hood, and the holding means allowing one to keep the protection hood in the receptacle in a way independent of the accessory;

during the removal of the accessory, the protection hood is held in the receptacle via holding means;

an accessory comprises a rain sensor, a frost sensor or a stain sensor.

BRIEF DESCRIPTION OF THE DRAWING

Other characteristics and advantages of the invention will appear in the reading of the detailed description which follows, for which one will refer to the attached drawings in which.

DETAILED DESCRIPTION

In the following description, in order to facilitate its comprehension, one will use, in a non-limiting manner, the terms horizontal, lower, upper, front, rear in reference to FIG. 1, in particular its orientation from left to right. Also in the following description, identical or similar elements will be designated by the same reference numbers.

Figure 1:
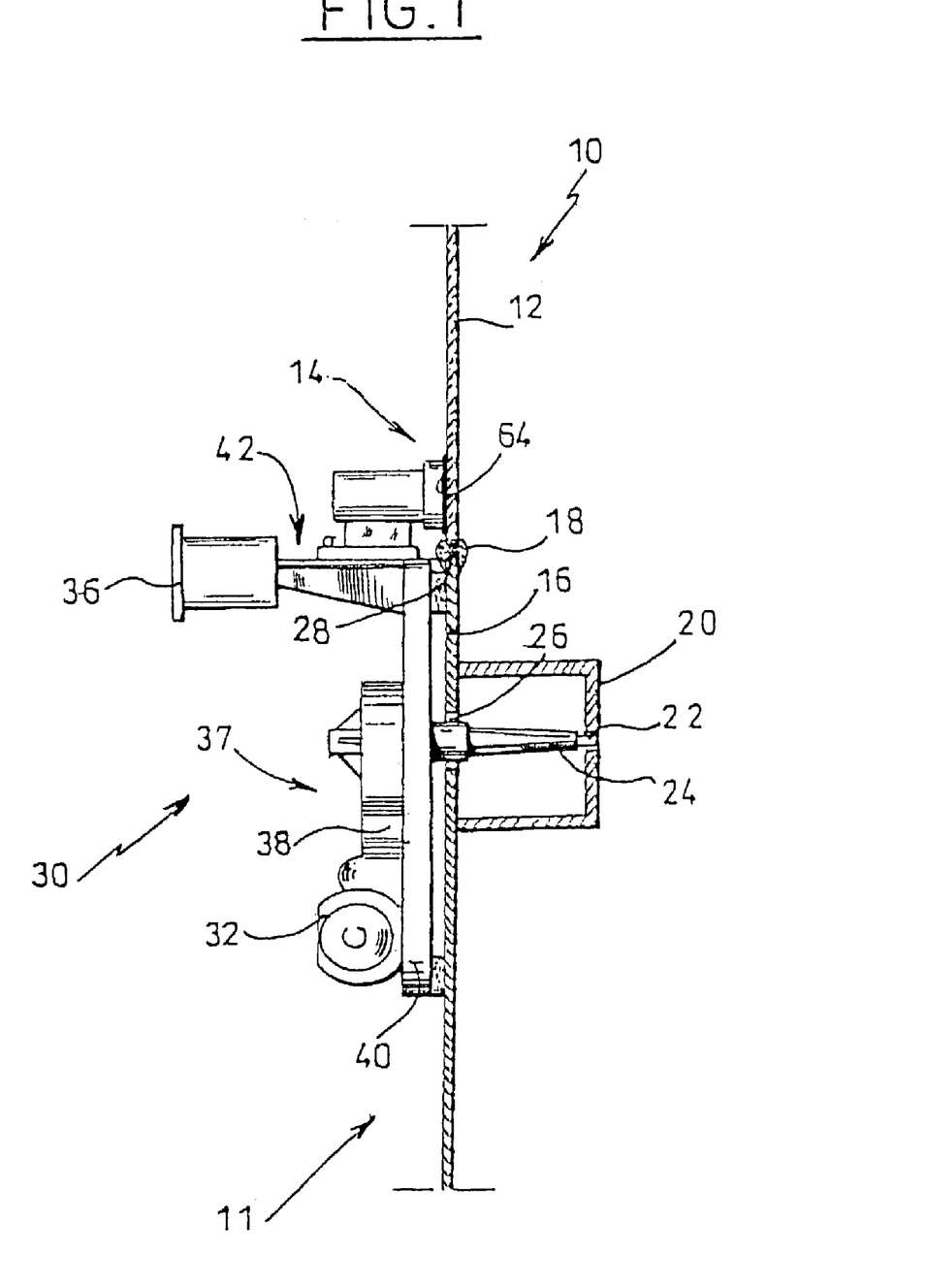
FIG. 1 is a side elevational view, partially in longitudinal section, of an equipping module according to the invention fixed onto a rear opening panel of a motor vehicle.

One has represented in FIG. 1 the rear part 10 of a motor vehicle and more specifically, a rear opening panel 11. A rear window or rear windshield 12 is mounted in an opening 14 in the external cabin panel or body 16 with a watertight joint interposition 18.

The rear part of the vehicle 10 is equipped with a wiper device for wiping the rear window 12 the driving head 20 of which is borne by the drive train 22 supported by a bearing or shaft 24 that crosses a passage hole 26 formed in the external cabin panel 16 next to the upper longitudinal edge 28 of the panel.

One also sees in FIG. 1 an equipping module 30 of the rear opening panel of the motor vehicle which comprises accessories, in particular, a drive motor or reduction motor 32 and the shaft 22 of the wiper device, of the light sources and of the positioning means 23 in the parked position of a wiper arm of the wiper device.

Here the light sources include a rear light signal, such as a brake signal called a brake light 34, and a light block 36 on the interior of the cabin and/or trunk of the vehicle. The light sources can also consist of a light or part of a signal light, such as a turn signal, a reverse light, and/or a fog light.

A light source can also comprise a light block (not represented) of the exterior of the vehicle, such as a light block of the license plate.

The reduction motor 32 includes a shell 37 that protects the motor and which is made up of a front hood 38 and a rear closing plate 40 which comprises the bearing or shaft 24. The various accessories are borne by a support plate 42.

According to the invention, the accessory support plate 42 forms a rear plate for closing 40 the drive motor 32 of the wiper device. In this way the brake light 34, the light block 36, and the front hood 38 of the motor 32 are mounted onto one single piece made up of the rear plate for the closing plate 40 of the drive motor 32.

The equipping module assembly 30 is thus simplified in relation to the state of art. In effect, the module 30 comprises one single piece containing first the rear closing 40 of the body 37 of the motor 32, and second, the support of the accessories.

Of course if the structure of the motor lends itself to it, the single piece can allow front closing of the motor rather than rear closing. In effect in certain motors, the closing plate of the body of the motor is a front closing, not a rear one. In addition, according to the materials used for the closing plate 40 and the front hood 38, it can be advantageous to attach the accessories onto the front hood. In this case the accessory support plate will form the front hood of the drive motor and the brake light 34, the light block 36, and the rear closing plate 40 will be attached onto a single piece made up of the front hood 38 or the motor 32.

The following description is based on the production method according to which the rear closing plate 40 forms the support plate. Of course a skilled artisan could easily adapt this description to the variations mentioned in the preceding paragraph.

The rear plate 40 for closing the drive motor 32 can be advantageously produced via molding in an electrically insulating material, such as plastic. The rear closing plate 40 can thus be molded around at least one lead, wire or cable 44 made of a electrically conductive material for the electric power supply of at least one accessory borne by the support plate 42, such as the drive motor 32, the brake light 34 and the light block 36 of the interior of the cabin and/or trunk of the vehicle, and/or an accessory not mechanically integrated into the module 30.

The leads 44, which can include metallic conductive bands, also allow the exchange of signals between accessories and an electric or electronic device (not represented) which can include surveillance means of the accessories.

The conductive leads 44 can be produced in materials or comprise different sections according to the magnitude of the current passing through them. In effect, the section of one conductive lead 44 and/or the nature of the material making it up can be different depending on whether it powers the power circuit of the brake light 34 or the light block 36, or the power circuit of the motor 32 or whether it allows the exchange of signals between the accessories and an electric device. The use of such conductive leads 44 embedded in the rear closing plate 40 is viable, very economical and simple to put into place.

Figures 3, 4:
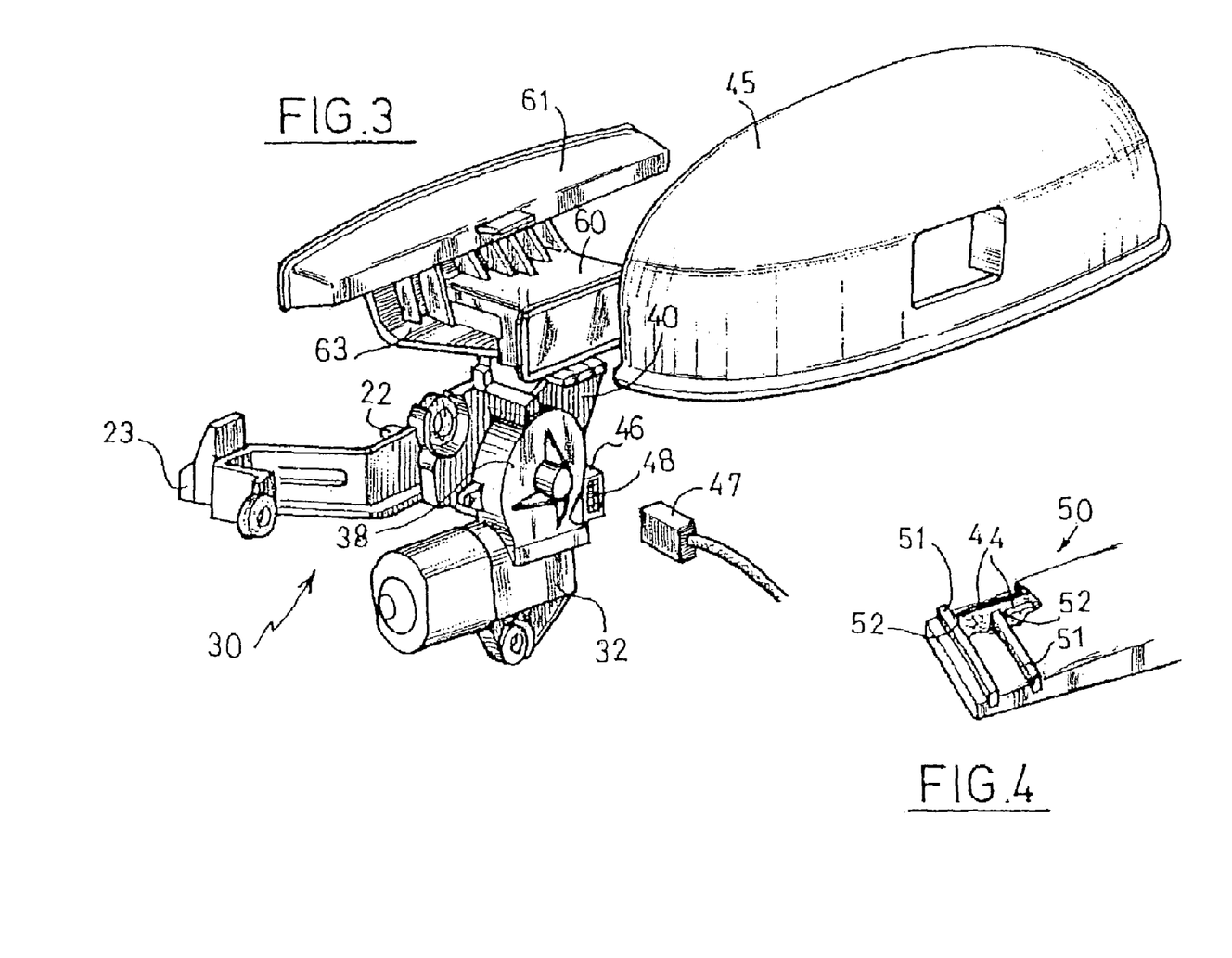
FIG. 3 is a perspective view according to arrow F in FIG. 2.
FIG. 4 is a horizontal longitudinal enlarged, perspective view of an electric power supply connection of an accessory of an equipped module.

Referring now to FIG. 3, the rear closing plate 40 includes at least one electric connector 46 for the power source of the module 30. The body of the electric connector 46 can be molded with the rear closing plate 40. The electric connector 46 includes conductive elements 48 which are electrically linked to a first end of the electric power supply leads 44 of the accessories.

During the mounting of the module 30 into the rear opening panel 11 of the motor vehicle, the electric connector 46 cooperates with a complementary electric connector 47 which is mounted onto the rear opening panel 11 and which allows the electric power supply of the leads 44 and the accessories from the general electric current circuit of the vehicle. The electric connectors 46 and 47 permit the exchange of signals between the accessories and the electric or electronic devices of the vehicle.

In a similar manner, the rear closing plate 40 can comprise an electric power supply connection 50 for each of the electric accessories of the module 30. The bodies of the connection 50 are preferably molded with the rear closing plate 40.

A panel covering 45 of the interior of the cabin and/or trunk of the vehicle is also represented on FIG. 3. It can also be mounted onto the closing plate 40 and at least partially cover the equipping module 30.

FIG. 4 represents a perspective, sectional view, according to a vertical plane of a portion of a connection 50.

The conductive elements 51 of the connection 50 are electrically linked to a second end 52 of the electrical accessory power supply leads 44.

Each accessory includes a complementary connection 49 of each connection 50 which allows the electrical linking of each accessory to an electric power supply lead 44.

The rear closing plate 40 includes, in addition, mounting and/or attachment means of the accessories.

Figure 2:
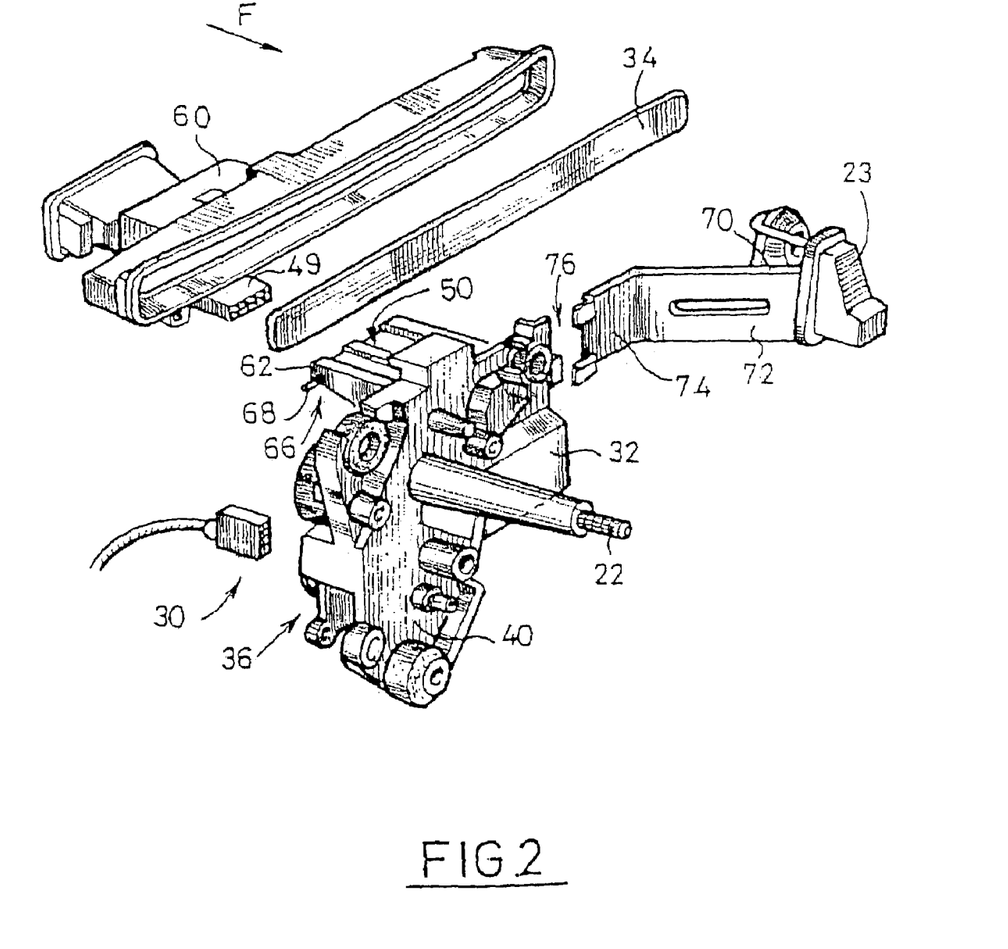
FIG. 2 is an exploded perspective view of the equipping module according to a first method of production of the invention.

Referring now to FIG. 2, the brake light 34 and the lighting block 36 of the interior of the cabin and/or trunk of the vehicle are mounted onto an intermediary element 60 which is assembled onto the rear closing plate 40 via first mounting and/or attachment elements 62.

The production of first the rear closing plate 40 and second the intermediary element 60 allows usage of different materials for each of these two elements.

The intermediary element 60 is formed of an upper brake light 34 covering part 61 and a lower lighting block 36 part 63. The upper part 61 and the lower part 63 parts can be produced separately via molding. In this case, it is advantageous that the material of each of the parts 61 and 63 be identical in order to facilitate their assembly, in particular, via ultrasonic welding.

Here the intermediary element 60 comprises an electrical power supply connection 49 shared between the brake light 34 and the lighting block 36. The cooperation of the body of the connection 49 with the first mounting and/or attachment elements 62 assures the longitudinal guiding of the intermediary element 60 during assembly with the rear closing plate 40. The longitudinal translation support is produced via immobilization means, such as a screw 68 situated in a transversal plane.

The closing plate 40 and the intermediary element 60 assembly is able to be dismantled, which allows, when the materials of the two elements are different, the facilitation of their recycling.

The rear closing plate 40 integrates the mounting and/or attachment elements 62 of the accessory, as well as the electric connector 46, the leads 44 and the electrical power supply connection 50 of the accessories. Such a rear closing plate 40 facilitates the assembly of the module 30.

Advantageously, the mounting and/or attachment elements 62 are similar which allows, according to the equipment level of each vehicle, the mounting of the accessories onto the same rear closing plate 40. It is the same for the electric power supply connectors 50 for the accessories.

In order to assure an optimal efficiency of the rear signal light 34, that is to say, emitting the maximum amount of light towards the rear of the vehicle, it is preferable to block dust from interfering between the interior face of the window 12 and the rear signal light 34. To this end, the rear signal light 34 is preferably disposed pushing against the interior face of the rear window 12 borne by the rear opening panel of the motor vehicle. Also, an annular-shaped joint 64 is interposed between the periphery of the light 34 and the interior face of the window 12 in order to assure its water tightness.

However, the dimensional tolerances of different pieces, in particular the position of the attachment means of the equipping module 30 onto the external panel covering 16, are sometimes too significant to assure the contact of the joint 64 with the interior face of the window 12. Thus, so that the joint 64 is always in contact with, first, the periphery of the rear signal light 34 and, second, with the interior face of the window 12, the equipping module 30 includes means 66 for regulating the longitudinal position of the signal light 34 and, thus, of the intermediary element 60. Here, the regulating means 66 includes the first mounting and/or attachment means 62 as well as an immobilization device, such as a screw 68 situated in a lateral side of the elements 62.

During the assembly, the rear closing plate 40 is attached onto the rear opening panel 11, the body of the connection 49 already being engaged in the first mounting and/or attachment elements 62. When the joint 64 enters into contact with the interior face of the window 12, the screw 68 is serrated in order to immobilize the body of the connection 49 in relation to the elements 62.

Figure 5:
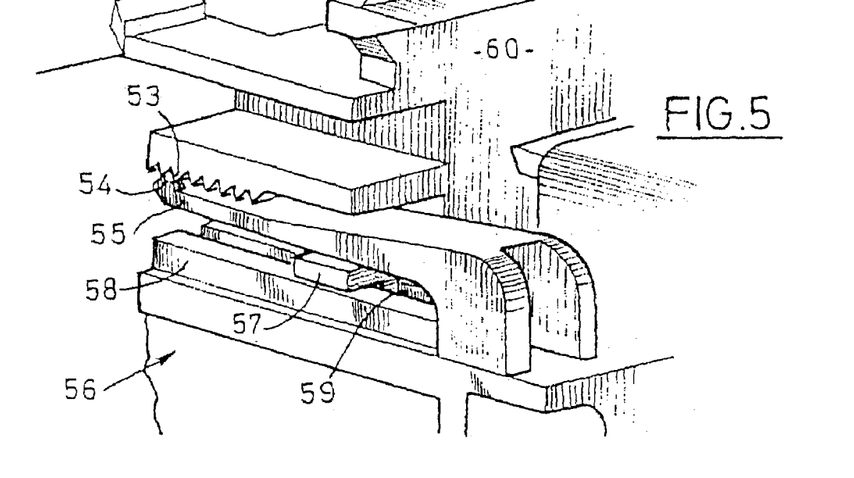
FIG. 5 is a perspective view of a longitudinal regulating device of an accessory in relation to a closing plate of a motor of an equipping module.

According to a variation partially represented in detail in FIG. 5, the regulation of the position and support in longitudinal translation of the intermediary element 60 in the direction of the window 12 can be obtained by cooperation with the notches 53 situated on a surface of the intermediary element 60 with a serration 54 formed at the free rear end of a tab 55 which is elastically deformable in order to be articulated transversally in relation to the closing plate 40. The tab 55 is produced in one single piece via molding with the closing plate 40, thus giving it the elasticity of the material in order to hold the serration 54 in one of the notches 53. One has thus created a system equivalent to a ratchet wheel and pawl.

When the intermediary element 60 is assembled to the closing plate 40, the inclined front face of the serration 54 is put into contact with a complementary rear face of a first notch 53. Then the intermediary element 60 is translated towards the rear in the direction of the rear window. During the course of this movement, the cooperation of the inclined front face of the serration 54 with the rear face of a notch 53 provokes the elastic stretching towards the bottom of the tab 55 until the upper head of the serration 54 is across from the following notch 53 and until the elasticity of the tab 55 returns the serration 54 into the notch 53.

The elastic oscillation movement of the tab 55 continues for each notch 53 until the joint 64 touches the interior face of the window 12. The intermediary element 60 is thus blocked in translation. In effect, the movement towards the rear is blocked by the window 12, and the vertical rear face of the serration 54 is pushed against the complementary front face of the notch 53 in which the serration 54 is introduced.

During recycling of the equipping module 30, a pressure towards the bottom of the rear free end of the plate 55 allows one to free any blockage. It is thus eased to pull the intermediary element 60 toward the front, in order to separate it from the rear closing plate 40. The selection of different materials of the elements making up the equipping module 30 is thus facilitated.

Also shown in FIG. 5, the guiding means 56 allow one to assure a good longitudinal and transversal alignment of the intermediary element 60, as well as recovery of the stress and vibrations.

The guiding means 56 includes, in particular, a shoe 57 which is vertically guided between an upper face of a soleplate 58 of the intermediary element 60 and the interior face of the tab 55. The shoe 57 includes a vertical rib 59 that extends towards the bottom and that cooperates with a complimentary longitudinal rib created in the soleplate 58 in order to assure the transversal guiding of the intermediary element 60.

Referring to FIG. 5, the notches 53 and the shoe 57 of the intermediary element 60 are longitudinally shifted back in relation to each other in order allow the bending of the rear free end of the tab 55 without pinching the shoe 57 against the upper face of the soleplate 58 and without disturbing its longitudinal translation. The longitudinal translation support can also be obtained via the adhesion of the joint 64, fixed onto the periphery of the rear signal light 34, onto the interior face of the window 12. The adhesion is obtained, for example, via glue or by a suction effect.

It is also possible to interpose a spring between the intermediary element 60 and the rear closing plate 40. Thus, when the rear closing plate 40 is mounted onto the rear opening panel 11 the spring allows permanent application of longitudinal stress in the direction of the window 12 onto the intermediary element. Such a mounting allows holding the joint 64 and the lower interior face of the window 12 in contact despite any vibrations leading to deformations or displacements relative to the rear signal light 34 and/or the rear window 12.

The positioning means 23, in a parked position, of a wiper arm of a wiper device is attached onto a first free end 70 of a transversal arm 72, the second end 74 of which is attached onto the rear closing plate 40 via a second mounting and/or attachment elements 76.

The positioning means 23 allows the positioning of the wiper arm in a parked position without the wiper blade being pushed against the exterior side of the vehicle, that is to say, against the exterior face of the window 12.

During assembly, the equipping module 30 is attached onto a side of the rear opening panel 11 across from the cabin or the trunk of the vehicle.

So that the exit shaft of the drive motor 32 of the wiper device and the positioning means 23 of a wiper arm are accessible from the exterior of the vehicle, the external cover panel 16 includes openings 26.

Figure 6:
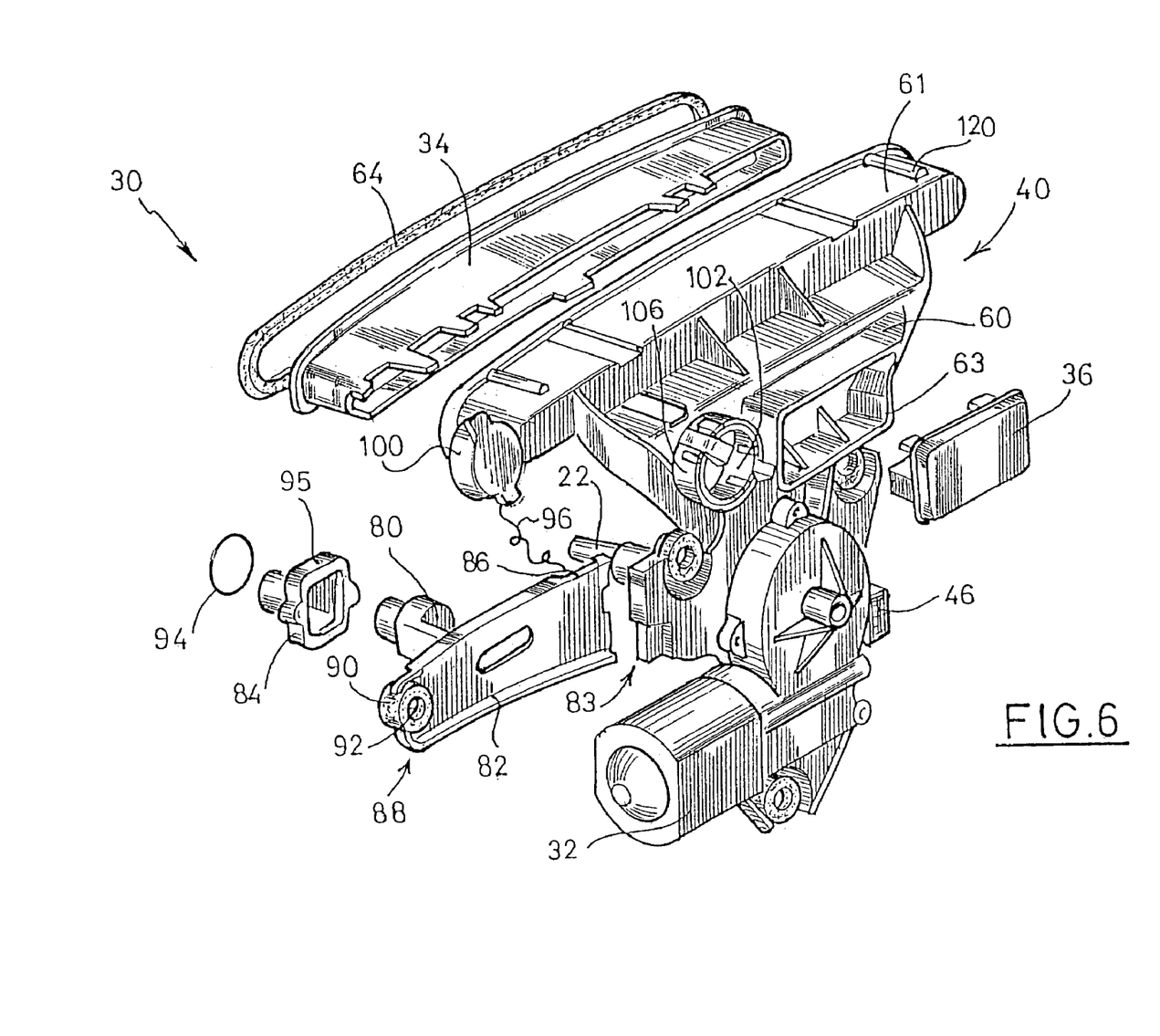
FIG. 6 is an exploded perspective view similar to FIG. 2 of the equipping module according to a production variation.

According to a variation, an accessory comprises an electronic optical vision system 80, in particular, a camera which is oriented towards the rear of the vehicle and which furnishes representative information about the exterior environment situated across from the electronic vision system 80. During the attachment of the equipping module 30 onto the rear opening panel, the electronic vision system 80 crosses an opening, not represented, of the external cover panel of the rear opening panel.

In order to protect the electronic vision system 80, in particular from dirt and projection of elements such as gravel, a transparent protection hood 84 is attached between the exterior of the vehicle and the electronic vision system 80. A first free end 86 of the detectable plate 82 is linked to the rear closing plate 40 via linking means 83, such as a system of elastic fitting, that allows, during the attachment of the equipping module 30 onto the rear opening panel, absorption of the dimensional stress of the different elements, and tolerance of the position of fixation means of the equipping module 30 onto the external cabin panel 16.

A second free end 88 of the detachable plate 82 includes an anchoring point 90 with the rear opening panel of the vehicle. An absorbing element 92 is interposed between the anchoring point 90 and the second free end 88 in order to absorb the vibrations of the rear opening panel so that the electronic vision system 80 is in the most stable possible and furnishes precise information to the user.

While the equipping module 30 including the electronic vision system 80 is assembled with the rear opening panel, the water tightness at the level of the opening of the external cover panel of the rear opening panel allowing the passage of the electronic vision system 80 is obtained via the arrangement of a circular joint 94 in the groove created for this purpose in a rear support side 95 of the protection hood 84. Thus, during the tightening of the fixation elements of the equipping module 30 onto the rear opening panel, the joint 94 is compressed between the front side of the external cover panel and the groove of the protection hood 84.

While the rear closing plate 40 includes linking means 83, it can be used either in vehicles that are or are not equipped with an electronic vision system 80. The storage, development, and production costs of such a rear closing plate 40 are thus significantly diminished.

The electronic system is electrically linked to an energy source by wires or leads 96, the free ends of which is connected to the conductive leads, not represented in FIG. 6, which are advantageously embedded in the rear closing plate 40 of the motor 32. The embedded leads also allow the transmission of representative exterior environmental information to a treating system, which then transmits the information to a display device located on the vehicle.

The display device furnishes a representative image of the exterior environment across from the electronic vision system 80. Thus, the display device such as a control screen, furnishes the driver with a view of the environment found behind the vehicle. Such an optical vision electronic system 80 associated with the display device allows, for example, replacement of the interior rear view mirror of the vehicle.

The treating system can also determine a parameter relative to an object, which can be another stopped or moving vehicle, in the exterior environment.

The parameter can be the relative speed or the distance between the object and the vehicle. The electronic vision system 80 thus helps the driver during a maneuver, in particular, parallel parking, by indicating to the driver the distance that separates the rear of his car and the object situated to the rear.

The electronic vision system 80 can also be situated on the interior of the cabin or trunk of the vehicle. In this case, it can be attached onto the upper part 61 of the rear closing plate 40 so that the electronic vision system 80 is across from the rear window. The electronic vision system 80 can also be received in the upper panel part 61 of the rear closing plate 40.

In all of these cases, the electric leads 44 embedded in the rear closing plate 40 allow the electric power supply of the electronic vision system 80 as well as the exchange of the signals with the treating system.

According to another variation, an accessory comprises a rain and/or frost and/or dirt sensor 100.

Such a sensor 100 must be protected between the time it is assembled to the rear closing plate 40 and the time when the equipping module 30 is attached onto the rear opening panel of the vehicle. Often, the assembly places of the closing plate 40, generally at its producer, and the attachment place of the equipping module 30 onto the rear opening panel of the vehicle, generally at the motor vehicle manufacturer, are different. The rain sensor 100 necessitates protection, which can be packaging, efficient against dirt and shocks.

Another solution consists of transporting the sensor 100 and the rear closing plate 40 in an independent fashion and assembling them at the time of attachment of the equipping module 30 onto the rear opening panel of the vehicle. The assembly operation necessitates delicate manipulations, such as the electric connection of the rain sensor 100 and the rear closing plate 40.

Figure 7:
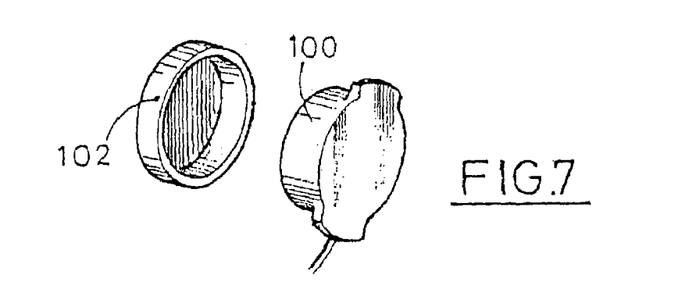
FIG. 7 is a perspective view of an equipping module accessory and its protection hood.

The invention proposes, during the production of the rain sensor 100, protecting its active part (that is to say, the part of the sensor that allows gathering information), by a protection hood 102 shown in FIG. 7. Then, during the assembly of the rear closing plate 40, the rain sensor 100 and the protection hood 102 are attached by means 104 onto the closing plate 40. The attaching means 104 are represented in detail in FIG. 8. They are made up of a receptacle 106, the interior diameter of which is complimentary to the exterior diameter of the protection hood 102. The height of the protection hood 102 is significantly greater than the depth of the receptacle 106.

During the assembly of the rear closing plate 40, the rain sensor 100 and the protection hood 102 are received in the receptacle 106. The annular side of the receptacle 106 include holding means which are for example, four holding tabs 108, 110, 112, with a longitudinal orientation, which are only represented in FIG. 8. They are diametrically opposed two 108, 110 by two 112.

Figure 8:
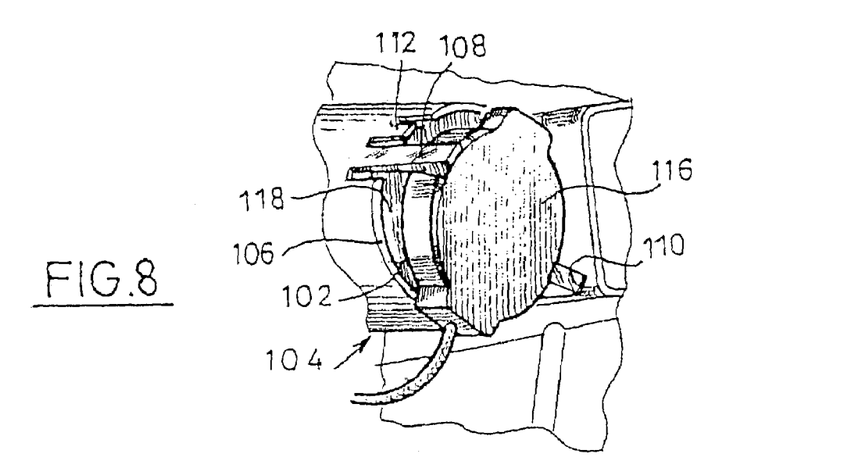
FIG. 8 is a detailed perspective view of an accessory similar to that represented in FIG. 7 temporarily fixed onto the equipping module.

The tabs 108, 110, and 112 allow longitudinal holding of the rain sensor 100 and the protection hood 102, respectively. In effect, the tabs 108, 110, and 112 include indentations that push against the transversal side of the end 116 of the rain sensor 100 and on the face of the free end of the annular side 118 of the protection hood 102, respectively. Thus, during the assembly of the rear closing plate 40, the rain sensor 100 and the protection 102 are engaged in the receptacle 106 and held by tabs 108, 110, and 112 which the rain sensor 100 elastically deforms.

The rain sensor 100 is protected from dirt and shocks by a simple device. During the attachment of the closing plate 40 onto the rear opening panel, the simple spreading via elastic deformation of the two tabs 108 and 110 allows freeing the rain sensor 100. The protection hood 102 which is useless to the functioning of the sensor 100, is held in the interior of the receptacle 106 by the two other tabs 112. The extraction operation of the sensor 100 is rapid and very simple. Such a production method allows diminished costs linked to logistics and mounting time, in particular, during the attachment of the equipping module on the rear opening panel.

The receptacles 106 and holding means 107 can be used for any other accessory.

FIG. 6 also represents two ribs 120 that are created on the upper face of the upper part 61 of the brake light 34 covering. The ribs 120 allow the guiding, in the longitudinal direction, of the panel covering (not represented on this figure) from the interior of the cabin and/or the trunk of the vehicle. Locking means, not represented, allow stabilization of the panel cover in relation to the equipping module 30.

Figure 9:
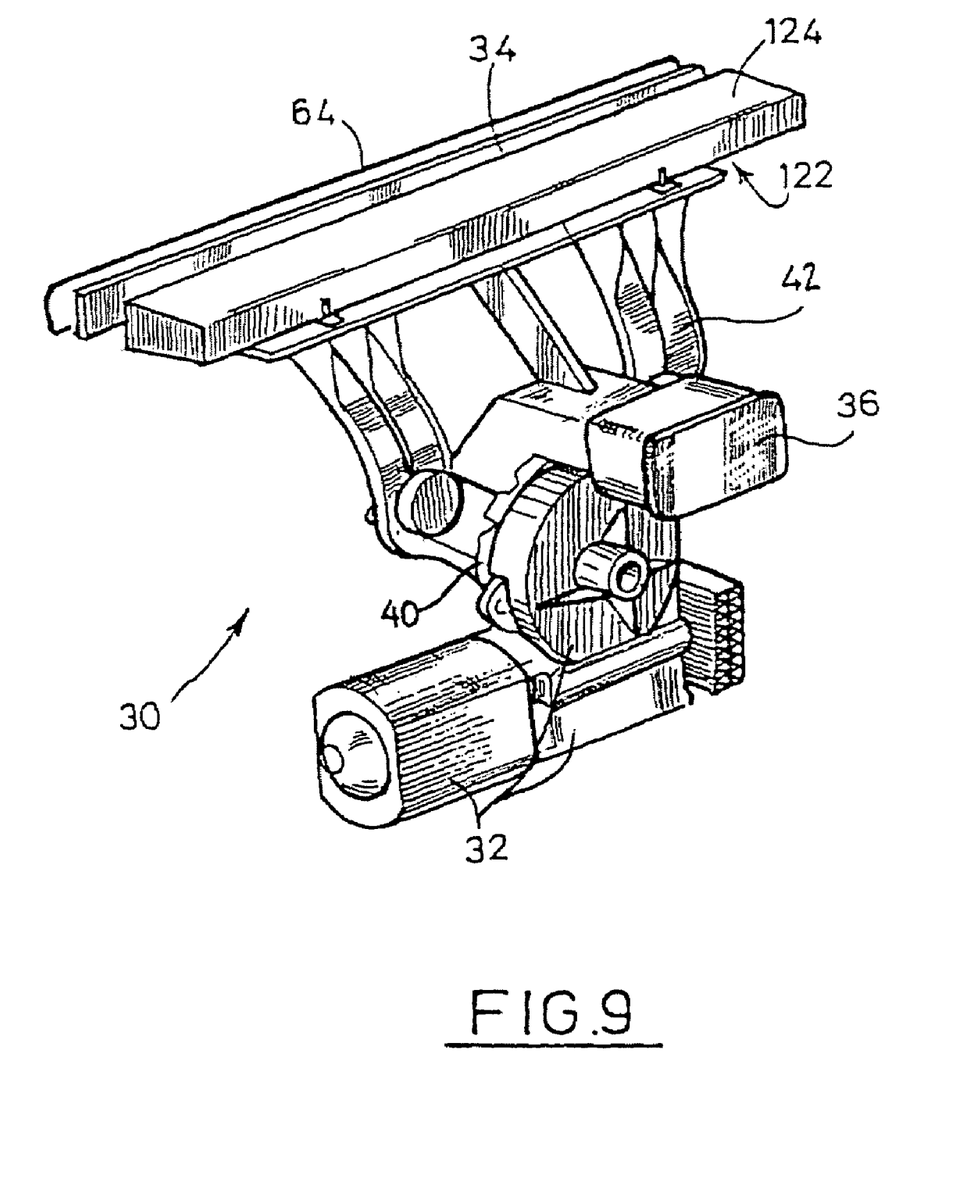
FIG. 9 is an exploded perspective view similar to FIG. 2 of an equipping module according to a second production method of the invention.

FIG. 9 depicts a second method of production of the invention. According to the second production method, it is the rear closing plate 40 that directly bears on the light block 36. The signal light 34 is mounted in a light support 124 which is attached to the rear closing plate 40. Regulating means 122 of the longitudinal position of the signal light 34 are situated between the light support 124 and the rear closing plate 40.

According to another production method, not represented, the light support is made up as one piece with the rear closing plate. Thus, a helicoidal-type spring can be interposed between the front end of the light support and the rear face of the light in order to exert a longitudinal force with tends to press the light against the interior face of the window.

The second and third production methods still decrease the number of separate pieces of the module 30 and, by consequence, its time and assembly cost. Regulating means 122 of the longitudinal position of the signal light 34 are situated between the light support 124 and the rear closing plate 40.

According to another production method, not represented, the light support is made up as one piece with the rear closing plate. Thus, a helicoidal-type spring can be interposed between the front end of the light support and the rear face of the light in order to exert a longitudinal force with tends to press the light against the interior face of the window.

The second and third production methods still decrease the number of separate pieces of the module 30 and, by consequence, its time and assembly cost.

What is claimed is:

1. A module for equipping a rear opening panel of a motor vehicle provided with a drive motor of a wiper device, the module comprising a support plate onto which accessories are attached, wherein the support plate forms a plate for closing the drive motor of the wiper device; and at least one electric connector power supply for the module, the power supply having a body molded with the closing plate and electrically linked to a first end of at least one electric power supply lead.

2. A module according to claim 1, wherein the closing plate of the drive motor is made of an electrically insulating material and molded around at least one lead in an electrically conductive material for one of an electric power supply, of at least one of the accessories carried relative to the support plate, and for the exchange of signals with the at least one of the accessories.

3. The module according to claim 1, further comprising only one power supply connector for all of the at least one electric power supply lead of the module.

4. The module according to claim 1, further comprising at least one electric power supply connection, at least one of the accessories having a body molded with the closing plate and linked electrically to a second end of at least one electrical power supply lead of the at least one of the accessories.

5. The module according to claim 1, further comprising at least one of a mounting element end an attachment element of at least one of the accessories molded with the closing plate.

6. The module according to claim 1, characterized by one of the accessories comprising a light source.

7. The module according to the claim 6, characterized by the light source comprising an interior light block of one of a cabin and a trunk of the vehicle.

8. The module according to claim 6, characterized by the light source comprising one of a rear signal light, a braking signal light, turn signal, a reverse light, a fog light, and a part of a light.

9. The module according to claim 8, characterized by the rear signal light pushing against an interior face of a rear window carried by the rear opening panel of the motor vehicle.

10. The module according to claim 8, characterized by the closing plate comprising regulating means of the position of the rear signal light across from one of an interior face of the rear window and from an opening of an external cover panel of an opening.

11. The module according to claim 6, characterized by the light source comprising a light block for the vehicle's exterior.

12. The module according to claim 1, characterized by the at least one of the accessories comprising positioning means of a wiper arm in a parking position.

13. The module according to claim 1, characterized by at least one of the accessories is accessible from the exterior of the vehicle across from an opening created in one of an external cover panel of the rear opening panel of the vehicle and of an opening created in a rear window.

14. The module according to claim 1, characterized by the at least one of the accessories comprising an electronic vision system oriented towards the exterior of vehicle and furnishing representative information of an exterior environment situated across from the electronic vision system.

15. The module according to claim 14, characterized by the representative information of the exterior environment treated by a treating system, then transmitted to a display device in the vehicle, said display device furnishing a representative image of the exterior environment across from the electronic vision system.

16. The module according to claim 14, characterized by the representative information of the exterior environment furnished by a treating system, said treating system at least one parameter relative to an object from the exterior environment.

17. The module according to claim 16, wherein the object from the exterior environment is another vehicle.

18. The module according to claim 14, wherein the electronic vision system is situated in the interior of the vehicle across from the rear window carried by the opening.

19. The module according to claim 14, wherein the electronic vision system is situated in the interior of the rear opening structure, and an opening is created in an external cover panel of the rear opening for viewing by the electronic vision system.

20. The module according to claim 14, wherein the electronic vision system is mounted onto a detachable plate linked to the closing plate via linking means for absorption of dimensional dispersions during the attachment of the module onto the opening.

21. The module according to claim 1, wherein, during assembly of the equipping module, at least part of an accessory is received in a receptacle in which the at least one of the accessories is temporarily held by holding means in order to protect it, and by, during attachment of the equipping module onto the opening, the at least one of the accessories is removable from the receptacle.

22. The module according to claim 21, wherein a part of at least one of the accessories is received in the receptacle being protected by a protection hood, and by the holding means allowing holding the protection hood in the receptacle independent from the at least one of the accessories.

23. The module according to claim 22, characterized by, during the extraction of the at least one of the accessories, the protection hood is held in the receptacle by the holding means.

24. The module according to claim 1, wherein the at least one of the accessories comprises one of a rain sensor, a frost sensor and a dirt sensor.

25. The module according to claim 9 wherein the rear signal light pushing against the interior face of a rear window carried by the rear opening panel of the motor vehicle is characterized by one of the interposition of a joint, and pushing against a curve of an opening of an external cover panel of the opening panel.

26. The module according to claim 8, wherein the signal light is mounted in a light support attached to the closing plate.

27. The module according to claim 26, further comprising regulating means of the longitudinal position of the signal light, wherein the regulating means is situated between the light support and the closing plate.

* * * * *

UNITED STATES PATENT AND TRADEMARK OFFICE
CERTIFICATE OF CORRECTION

PATENT NO. : 7,237,820 B2
APPLICATION NO. : 10/275631
DATED : July 3, 2007
INVENTOR(S) : Franck Cathala et al.

Page 1 of 1

It is certified that error appears in the above-identified patent and that said Letters Patent is hereby corrected as shown below:

Column 1, Line 22; Delete "multiples" and insert --multiplies--, therefor.
Column 1, Line 24; After "necessary" delete "of" and insert --to--, therefor.
Column 2, Line 29 (Approx.); After "window" delete ";" and insert --;--, therefor.
Column 2, Line 55 (Approx.); Delete "detectable" and insert --detachable--, therefor.
Column 3, Line 22 (Approx.); Delete "equipped" and insert --equipping--, therefor.
Column 4, Line 30 (Approx.); After "38" delete "or" and insert --of--, therefor.
Column 5, Line 13; Delete "connection" and insert --connections--, therefor.
Column 5, Line 67; Delete "connectors" and insert --connections--, therefor.
Column 7, Line 65; Delete "detectable" and insert --detachable--, therefor.
Column 8, Line 29; Delete "ends" and insert --end--, therefor.
Column 10, Line 56; In Claim 5, delete "end" and insert --and--, therefor.

Signed and Sealed this

Sixth Day of November, 2007

JON W. DUDAS
*Director of the United States Patent and Trademark Office*